United States Patent [19]

Suzuki et al.

[11] Patent Number: 4,885,762
[45] Date of Patent: Dec. 5, 1989

[54] TELEPHONE APPARATUS

[75] Inventors: Katsuo Suzuki; Kazuyuki Umebayashi, both of Tokyo, Japan

[73] Assignee: Aisin Seiki Kabushiki Kaisha, Aichi, Japan

[21] Appl. No.: 176,066

[22] Filed: Mar. 31, 1988

[30] Foreign Application Priority Data

Mar. 31, 1987 [JP] Japan ................... 62-80748

[51] Int. Cl.$^4$ ............................................. H01M 1/27
[52] U.S. Cl. ........................................ 379/58; 379/200; 379/355; 379/62
[58] Field of Search ................ 379/56, 58, 59, 200, 379/355, 354, 62, 63

[56] References Cited

U.S. PATENT DOCUMENTS

| | | | |
|---|---|---|---|
| 4,332,982 | 6/1982 | Thomas | 379/200 |
| 4,332,985 | 6/1982 | Samuel | 379/355 |
| 4,453,040 | 6/1984 | Wolf et al. | 379/200 |
| 4,467,140 | 8/1984 | Fathauer et al. | 379/61 |
| 4,546,211 | 10/1985 | Fane, III | 379/355 |
| 4,639,552 | 1/1987 | Hall | 379/199 |
| 4,720,855 | 1/1988 | Ohnishi et al. | 379/354 |
| 4,723,265 | 2/1988 | Kamei et al. | 379/58 |
| 4,736,410 | 4/1988 | Nishida et al. | 379/354 |
| 4,817,133 | 3/1989 | Takahashi et al. | 379/199 |

Primary Examiner—Robert Lev
Attorney, Agent, or Firm—Sughrue, Mion, Zinn Macpeak & Seas

[57] ABSTRACT

A telephone apparatus has abbreviated number input means for inputting an abbreviated number in a predetermined form, password input means for inputting a password in a predetermined form, a telephone number memory section for storing terminating subscribers' telephone numbers in correspondence with combinations of abbreviated numbers and passwords, and a control section for selecting and outputting a terminating subscriber's telephone number from the telephone number memory section in response to a dialing start signal and on the basis of a combination of an abbreviated number and a password included in the dialing start signal. Thus, since the telephone number memory section is accessed on the basis of a combination of an abbreviated number and a password, even if an abbreviated number is known, the corresponding terminating subscriber's telephone number is not read out unless an appropriate password is input. Accordingly, there is no fear of the stored telephone numbers coming to a third person's knowledge.

6 Claims, 7 Drawing Sheets

… ~ …
4,885,762

1

TELEPHONE APPARATUS

BACKGROUND OF THE INVENTION

1. Field of the Invention

The present invention relates to a telephone apparatus which enables a telephone call to be made using an abbreviated number. More particularly, the present invention pertains to a telephone apparatus in which a password is related to each abbreviated number in order to prevent the abbreviated number from coming to a third person's knowledge.

2. Description of the Prior Art

As a conventional apparatus of the type described above, a telephone apparatus disclosed in Japanese Patent Laid-Open No. 61-82560 (1986) has heretofore been known.

In this prior art, when an abbreviated number is input, a control section selects a terminating subscriber's telephone number which has been stored in a telephone number memory section in correspondence with the abbreviated number, and the selected terminating subscriber's telephone number is delivered. Accordingly, it is unnecessary to dial a telephone number consisting of a large number of digits, e.g., 10 digits, and therefore the prior art exhibits superior operability. Further, each abbreviated number is composed of about 2 digits, i.e., '#' and 'numeral' (one of the ten numerals, 0 to 9), and therefore is easy to memorize.

The above-described prior art suffers, however, from the problem that, since abbreviated numbers are simple, even a third person can manipulate them and therefore there is a fear of the abbreviated telephone numbers stored in the telephone number memory section readily coming to a third person's knowledge.

SUMMARY OF THE INVENTION

In view of the above-described circumstances, it is a primary object of the present invention to provide a telephone apparatus which is so designed that each abbreviated number is related to a password in order to prevent the terminating subscriber's telephone numbers stored in the telephone number memory section from coming to a third person's knowledge.

To this end, the present invention provides a telephone apparatus comprising: abbreviated number input means for inputting an abbreviated number in a predetermined form; password input means for inputting a password in a predetermined form; a telephone number memory section for storing terminating subscriber's telephone numbers in correspondence with combinations of abbreviated numbers and passwords; and a control section for selecting and outputting a terminating subscriber's telephone number from the telephone number memory section in response to a dialing start signal and on the basis of a combination of an abbreviated number and a password included in the dialing start signal.

Thus, according to the present invention, the telephone number memory section for storing terminating subscriber's telephone numbers is accessed on the basis of a combination of an abbreviated number and a password. Accordingly, even if an abbreviated number is known, the corresponding terminating subscriber's telephone number is not read out unless an appropriate password is input. Therefore, there is no fear of the stored telephone numbers coming to a third person's knowledge.

The above and other objects, features and advantages of the present invention will become more apparent from the following description of the preferred embodiment thereof taken in conjunction with the accompanying drawings.

BRIEF DESCRIPTION OF THE DRAWINGS

FIGS. 5 to 11 show flowcharts, in which:

FIG. 5 shows the processing for registering and designating a password;

FIG. 6 shows the ordinary calling processing;

FIGS. 7 and 8 show the calling processing;

FIG. 9 shows the incoming processing;

FIG. 10 shows the handset talking processing; and

FIG. 11 shows the master telephone talking processing.

DESCRIPTION OF THE PREFERRED EMBODIMENT

A preferred embodiment of the present invention will be described hereinunder with reference to the accompanying drawings. In this embodiment, the present invention is applied to a car telephone.

Figure 2:
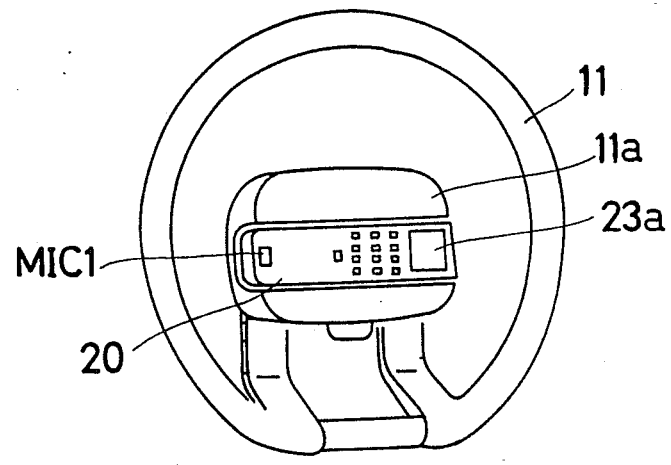
FIG. 2 shows the external appearance of a car telephone apparatus mounted on a pad portion of a steering wheel.

A mobile telephone 30 is a commercially available car telephone. In this embodiment, the mobile telephone 30 and a handset 20 which is disposed on a pad portion 11a of a steering wheel 11 are connected through an aural signal control circuit section 32 so that it is possible to make a telephone call from the handset 20 through the mobile telephone 30 (see FIG. 2). The handset 20 is designed to enable abbreviated number call (described later).

Figure 4:
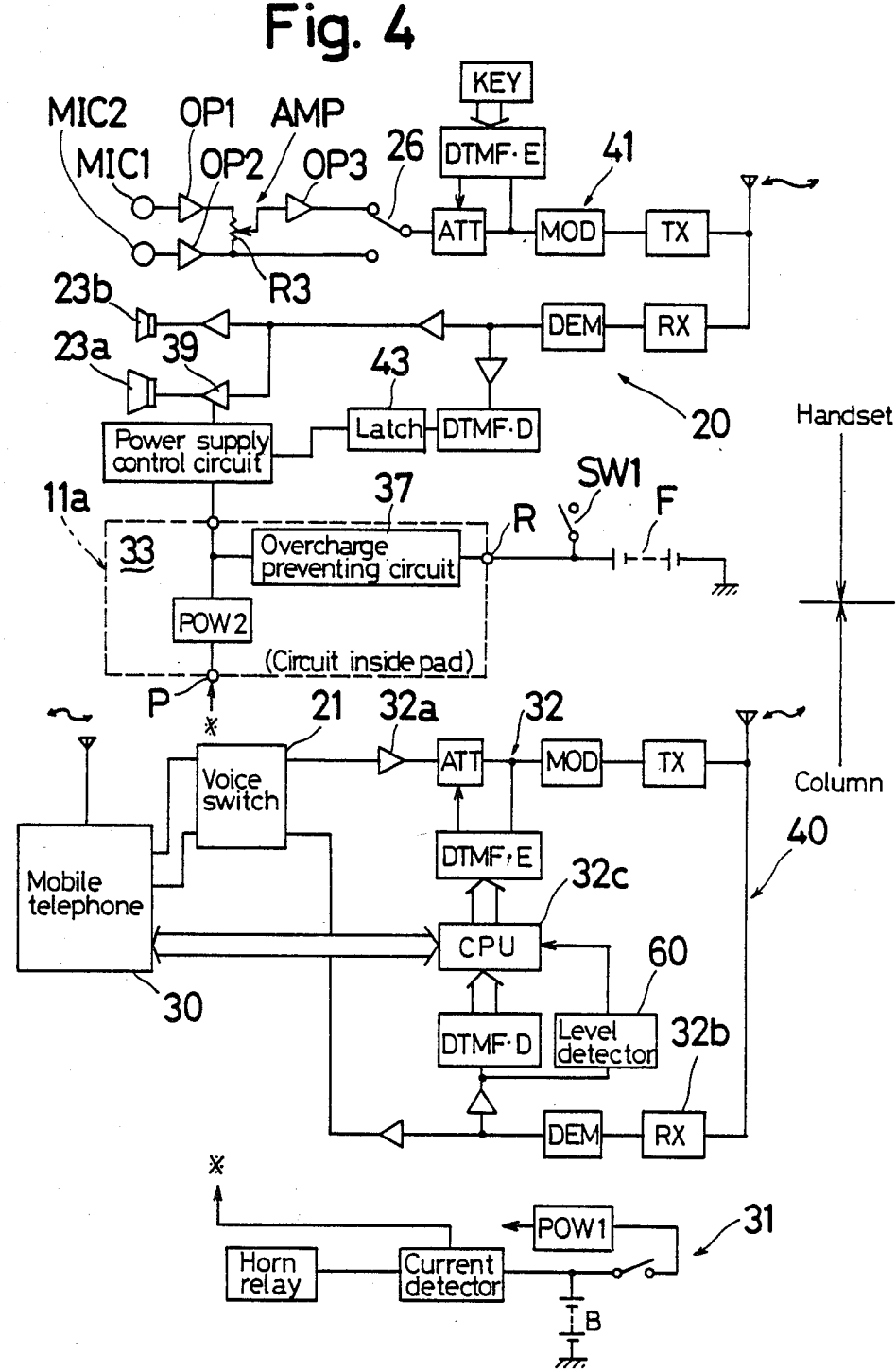
FIG. 4 is a block diagram schematically showing the arrangement of the car telephone apparatus according to the present invention.

As shown in FIG. 4, the telephone apparatus according to the present invention comprises an aural signal processing circuit section 41 incorporated in the handset 20 which is detachably disposed on the pad portion 11a of the steering wheel 11, a constant voltage circuit section 33 provided inside the pad portion 11a and including a constant voltage circuit POW2, an aural signal control circuit section 32 provided on a steering column 40, and a power supply circuit section 31 including an onboard battery B and defining a constant voltage circuit POW1 for the aural signal control circuit section 32 (see FIG. 4).

The aural signal processing circuit section 41 in the handset 20 is connected to the aural signal control circuit section 32 on the steering column 40 by means of radio communication. The aural signal control circuit section 32 controls signals which are input and output between the mobile telephone (hereinafter referred to as the "master telephone") 30 and the aural signal processing circuit section 41. The handset 20 has an internal power supply E which is defined by a rechargeable Ni-Cd battery. During loudspeaker-assisted talking (hereinafter referred to as "remote talking"), the handset 20 is connected to the constant voltage circuit section 33 provided in the pad portion 11a so that it is driven by the onboard battery B and also the battery E is charged thereby.

Figure 3A:
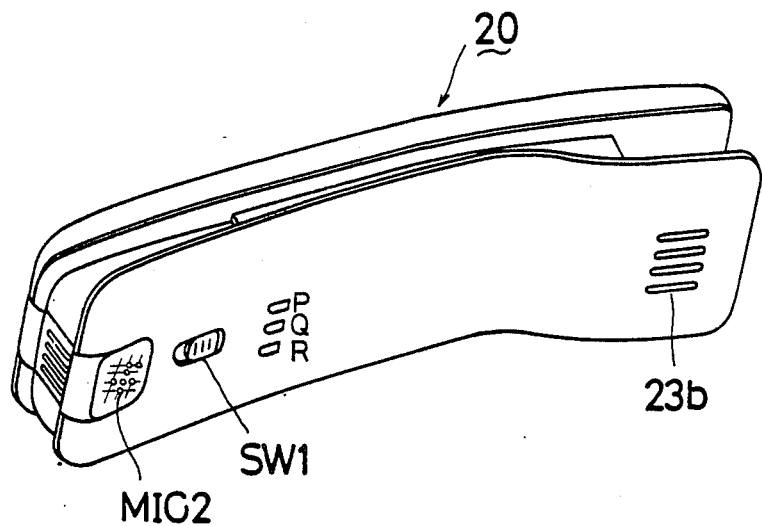
FIGS. 3a, and 3b show in combination the external appearance of the handset of the car telephone.
Figure 3B:
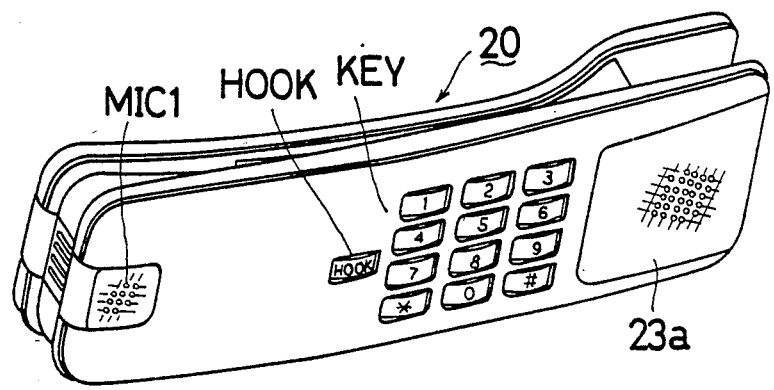

The handset 20 illustrated in FIGS. 3a and 3b will next be explained.

The handset 20 has a rectangular configuration in a front view and is provided on its front side with a series of keys KEY including numeral keys and a hook key HOOK which is used to set start and, end of a telephone call. On the rear side of the handset 20 are disposed a power switch SW1 which determines whether or not the handset 20 is to be activated, a loudspeaker power supply contact P which is connected to a contact (not shown) provided on the pad portion 11a when the handset 20 is placed thereon, a ground contact Q, and a contact R for a charging power supply.

A microphone and a loudspeaker are disposed at the left- and right-hand ends (as viewed in FIGS. 3a and 3b), respectively, of the handset 20. The microphone is composed of first and second microphones MIC1 and MIC2 which are disposed inside the handset 20 in such a manner that the two microphones are spaced from each other on opposite sides of the handset 20. The microphones MIC1 and MIC2 are disposed coaxially with each other in such a manner as to face in opposite directions. The loudspeaker is composed of a remote-talking loudspeaker 23a which is disposed on the front side of the handset 20 in such a manner as to face forward thereof and a close-talking loudspeaker 23b which is disposed on the rear side of the handset 20 in such a manner as to face rearward thereof.

More specifically, the front side of the handset 20 is used for remote talking (i.e., talking carried out with the handset 20 placed on the pad portion 11a), whereas the rear side of the handset 20 is used for close talking (i.e, talking carried out with the handset 20 removed from the pad portion 11a).

The aural signal processing circuit section 41 incorporated in the handset 20 will next be explained (see FIG. 4).

The first and second microphones MIC1 and MIC2 are connected to a differential amplifier AMP. The amplifier AMP is connected to a first input terminal of a voice input change-over switch 26. The second microphone MIC2 is connected to a second input terminal of the voice input change-over switch 26. The output terminal of the voice input change-over switch 26 is connected to a high-frequency transmitter TX through an attenuator ATT and a modulator MOD.

A dual tone multi-frequency encoder DTMF.E is connected to the keys KEY. The encoder DTMF.E has first and second output terminals, the first terminal being connected to the attenuator ATT, and the second output terminal being connected to a transmitting aural signal line which extends between the attenuator ATT and the modulator MOD. The encoder DTMF.E outputs a control signal from the first output terminal in response to the operation of the keys KEY. With the control signal, the attenuator ATT is activated to attenuate the aural signal delivered from the microphones MIC1, MIC2. Accordingly, the signal which is input to the modulator MOD is only a keyed signal, that is, a dial signal, which is generated in the encoder DTMF.E on the basis of the operation of the keys KEY.

The encoder DTMF.E is a so-called DTMF signal generator which generates a DTMF signal corresponding to the one of the keys KEY, including the hook key HOOK, which is actuated. The modulator MOD frequency-modulates the aural signal using a carrier wave having a first frequency.

With the above-described mechanism, the voice of the user of the handset 20 is transmitted.

The following is a description of the reception of the other party's voice through the handset 20.

The receiving mechanism includes a high-frequency receiver RX which is connected to an antenna to receive a signal, a frequency demodulator DEM for demodulating a signal received by the receiver RX, and close- and remote-talking loudspeakers 23b, 23a which are connected to the demodulator DEM. To the demodulator DEM are successively connected a dual tone multi-frequency decoder DTMF.D and a latch 43. The latch 43 controls a power supply control circuit 38 of an amplifier 39 for the remote-talking loudspeaker 23a.

In this receiving mechanism, a received signal is amplified in the high-frequency receiver RX. Then, the received aural signal is demodulated in the demodulator DEM on the basis of a second frequency. This received aural signal is output from the loudspeakers 23a and 23b in the form of a voice. The decoder DTMF.D detects whether or not the received aural signal includes a hook signal, and outputs a control signal to the latch 43 in accordance with the result of the detection. In response to the control signal, the output of the latch 43 changes from a high level H to a low level L, or vice versa. More specifically, if a hook signal is included in the received aural signal, the state of the latch 43 changes from the L level to the H level. As a result, the power supply control circuit 38 is activated to bring the amplifier 39 into an active state, and the latch 43 maintains this H level state. If a hook signal is detected subsequently, the state of the latch 43 changes from the H level to the L level. As a result, the power supply control circuit 38 is suspended to inactivate the amplifier 39, and the latch 43 maintains this L level state.

It should be noted that the decoder DTMF.D, which operates in reverse relation to the above-described encoder DTMF.E, detects a DTMF signal and outputs either an H- or L-level signal.

A battery E is disposed in the handset 20 to activate each portion of the aural signal processing circuit section 41 through a power switch SW1. In regard to the remote-talking loudspeaker 23a, the amplifier 39 therefor is activated by the constant voltage circuit section 33 for the handset 20 which is provided in the pad portion 11a. Accordingly, voice is generated from the remote-talking loudspeaker 23a only when the handset 20 is on the pad portion 11a and the contact P is in a connected state, and, what is more, the power supply control circuit 38 is made operative by the latch 43. It is a matter of course that the remote-talking loudspeaker 23a is inactivated when the handset 20 is removed from the pad portion 11a.

The constant voltage circuit section 33 for the handset 20 which is provided in the pad portion 11a consists of a constant voltage circuit POW2 connected to the onboard battery B and an overcharge preventing circuit 37 which is provided between the constant voltage circuit POW2 and the battery E. The constant voltage circuit POW2 is connected to the power supply control circuit 38 in the handset 38 and to the battery E through respective contacts P and R. The contacts P and R are closed when the handset 20 is placed on the pad portion 11a and these contacts are mechanically opened when the handset 20 is removed from the pad portion 11a.

The aural signal control circuit section 32 disposed on the steering column 40 will next be explained. The aural signal control circuit section 32 has a transmission control circuit 32a which transmits the signal representing the other party's voice which is delivered from the mobile telephone 30 to the handset 20, a reception control circuit 32b which receives the aural signal from the user, that is, the handset 20, and a control circuit 32c which applies control signals to the mobile telephone 30 and the transmission control circuit 32a in accordance with signals included in the aural signal from the user. Further, a voice switch 21 is interposed between the mobile telephone 30 and the circuits 32a, 32b.

The transmission control circuit 32a consists of an attenuator ATT, a frequency modulator MOD and a high-frequency transmitter TX, while the reception control circuit 32b consists of a high-frequency receiver RX and a frequency demodulator DEM. The control circuit 32c is composed of a decoder DTMF.D, a microcomputer CPU, an encoder DTMF.E and a received signal level detector 60.

The signal representing the other party's voice which is delivered from the mobile telephone 30 is modulated in the modulator MOD, amplified in the transmitter TX and then transmitted from the antenna. On the other hand, the signal representing the user's voice which is received by the antenna is amplified in the receiver RX and then demodulated to a signal of low frequency in the demodulator DEM. This low-frequency aural signal is applied t the mobile telephone 30 through the voice switch 21.

The low-frequency aural signal is also applied to the decoder DTMF.D where DTMF signals included in the aural signal are converted into H- or L-level signals. When detecting a signal based on the operation of the keys KEY from the H- or L-level signals, the microcomputer CPU operates as described later. When a hook signal based on the operation of the hook key HOOK on the handset 20, the microcomputer CPU activates the attenuator ATT through the encoder DTMF.E to attenuate the aural signal from the other party and also inserts a hook signal as a DTMF signal into a signal line extending between the attenuator ATT and the modulator MOD The hook signal is detected in the decoder DTMF.D in the aural signal processing circuit section 41 in the handset 20, thus activating the latch 43 to bring the remote-talking loudspeaker 23a into either an active or inactive state.

The level detector 60 detects a noise level of a received signal delivered from the handset 20 and applies either an H- or L-level signal to the microcomputer CPU in accordance with the noise level. In the frequency demodulator DEM, when there is no received signal, the noise level of the received signal is high, and therefore it is possible to judge that, when the noise level is high, the power switch SW1 of the handset 20 is OFF. More specifically, the level detector 60 detects whether the power switch SW1 of the handset 20 is ON or OFF.

The mobile telephone 30 and the microcomputer CPU are interconnected. The microcomputer CPU can detect the hook state of the mobile telephone 30. The microcomputer CPU is further able to set preferentially the mobile telephone 30 in either an on-hook state or an off-hook state. In addition, the microcomputer CPU can detect whether or not the mobile telephone 30 is located within a range where radiotelephone communication can be made.

It should be noted that the modulator MOD in the aural signal control circuit section 32 and the demodulator DEM in the aural signal processing circuit section 41 carry out modulation and demodulation on the basis of a first frequency. The demodulator DEM in the aural signal control circuit section 32 and the modulator MOD in the aural signal processing circuit section 41 carry out demodulation and modulation on the basis of a second frequency. Accordingly, it is possible to discriminate between transmitting signals and received signals.

The power supply circuit section 31 has a constant voltage circuit POW1 which is supplied with a voltage from the onboard battery B to output a constant voltage, thus driving each circuit in the aural signal processing circuit section 32. The onboard battery B is also connected to the constant voltage circuit POW2 in the constant voltage circuit section 33.

The input change-over switch 26, together with the differential amplifier AMP, will next be explained.

As shown in FIG. 4, the differential amplifier AMP consists of operational amplifiers OP1, OP2 which analog-amplify aural signal scollected by the first and second microphones MIC1, MIC2, respectively, a variable resistor R3 which balances the outputs of the operational amplifiers OP1, OP2 with each other, and an operational amplifier OP3 which is supplied with the outputs of the operational amplifiers OP1, OP2 through the variable resistor R3 and which outputs the result of addition of the outputs. Accordingly, the first and second microphones MIC1, MIC2 constitute in combination a gradient microphone which is a microphone whose electrical response corresponds to some function of the difference in pressure between two points in space.

On the other hand, the input change-over switch 26 is connected as illustrated (see FIG. 4) when the handset 20 is on the pad portion 11a. When the handset 20 is removed from the pad portion 11a, the switch 26 is changed over so as to be connected to the microphone MIC1 alone. When the handset 20 is on the pad portion 11a, the aural signal from the secondary voice microphone is output, whereas, when the handset 20 is removed from the pad portion 11a, the aural signal from the second microphone MIC2 is output.

Figure 1:
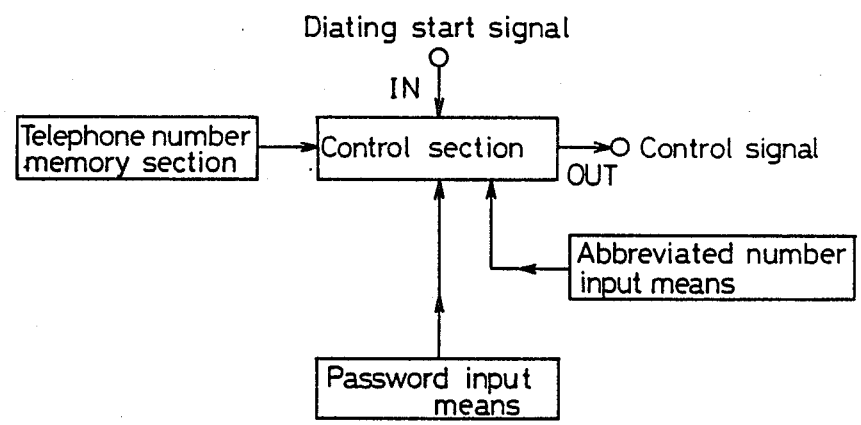
FIG. 1 is a block diagram showing the concept of the telephone apparatus according to the present invention.

The microcomputer CPU will next be explained. As illustrated in FIG. 1, the microcomputer CPU has a telephone number memory section which is an erasable and programmable memory for storing telephone numbers and a control section which reads out and outputs a telephone number from the telephone number memory section in accordance with the operation of the keys KEY. Further, a password input means and an abbreviated number input means are connected to the control section These input means are arranged in the form of keys KEY provided on the handset 20.

Data which is stored in the telephone number memory section has a structure consisting of a password, an abbreviated number and telephone number data. When a password and an abbreviated number are designated, the corresponding telephone number data is read out.

The control section has the following basic functions.

(a) Abbreviated Number Call:

This is available from the handset 20 only (unavailable from the master telephone 30).

(b) Talking over Handset 20:

The handset 20 is made available by turning ON the power switch SW1 provided on the handset 20 and then inputting a designated password.

(c) Relationship between Designated Password and Abbreviated Number:

When an abbreviated number is input with the handset 20 set in an available state, a desired telephone number is read out from the telephone number memory section on the basis of the input abbreviated number and the designated password which has been input.

Further, the control section operates as follows in response to the operation of the keys KEY on the handset 20.

---

(i) Registration of Password:
A password is registerd by actuating the keys KEY, as shown below.

o o o o o   (o represents numeral keys)

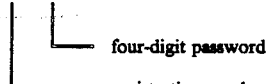

└── four-digit password
 └── registration number (1 to 9)

(ii) Input and Reset of Designated Password:
 · Turn ON the power switch SW1 on the handset 20

· o o o o   (a designated password is input by actuating the numeral keys)

· (various operations)

· Turn OFF the power switch SW1 on the handset 20 (the designated password is reset)

(iii) Ordinary Call:
 HOOK   o o o ... o o o
  │          terminating subscriber's telephone number
  │ talking
  ▼
 HOOK (iv) Reception:
 HOOK
  │ talking
  ▼
 HOOK (v) Last Number Call (a kind of abbreviated number call)
 HOOK * 0
  │ talking
  ▼
 HOOK (vi) Registration of Abbreviated Number:
 * o   o o o ... o o *

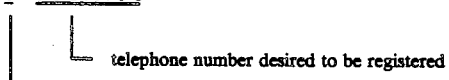

└── telephone number desired to be registered
 └── abbreviated number (1 to 9)

(vii) Abbreviated Number Call:
 HOOK * o   abbreviated number (1 to 9)
  │ talking
  ▼
 HOOK

---

It should be noted that iii) to vii) are various operations which are conducted after a designated password has been input.

The control which is carried out in the control section of the microcomputer CPU on the basis of the above-described functions will next be explained with reference to the flowcharts shown in FIGS. 5 to 11.

Figure 5:
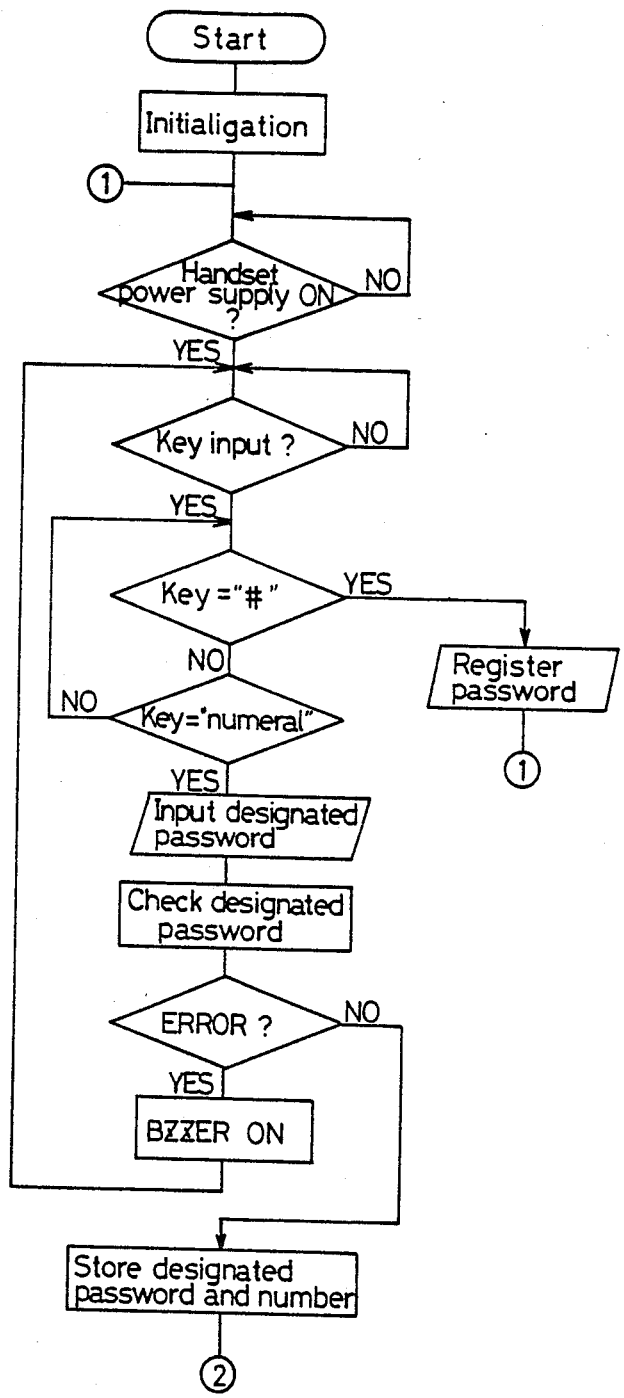

As shown in FIG. 5, the microcomputer CPU is initialized when connected to the power supply.

Next, the microcomputer CPU refers to the level of the output of the level detector 60 to judge whether or not the power switch SW1 on the handset 20 is ON. In the case where the output of the level detector 60 is at L level and the power switch SW1 is therefore judged to be OFF, the microcomputer CPU stands by for the power switch SW1 to be turned ON.

When the output of the level detector 60 is raised to the H level and it is therefore judged that the power switch SW1 is ON, the microcomputer CPU then makes a judgement as to whether or not any of the keys KEY, HOOK has been actuated. If YES, the microcomputer CPU judges which key KEY, HOOK has been actuated. When the key '#' has been actuated, registration of a password is executed [see the above-described i)].

When numeral keys alone have been actuated, the processing for inputting a designated password is executed [see the above-described ii)]. Then, the microcomputer CPU checks the input password, and if there is an error, for example, if the input password is different from the password which has already been registered, a buzzer sound is generated from the loudspeaker incorporated in the handset 20. When there is no error, the input designated password is stored in the memory. Thus, the handset 20 is brought into an operative state, that is, it is made available for making a telephone call.

Figure 6:
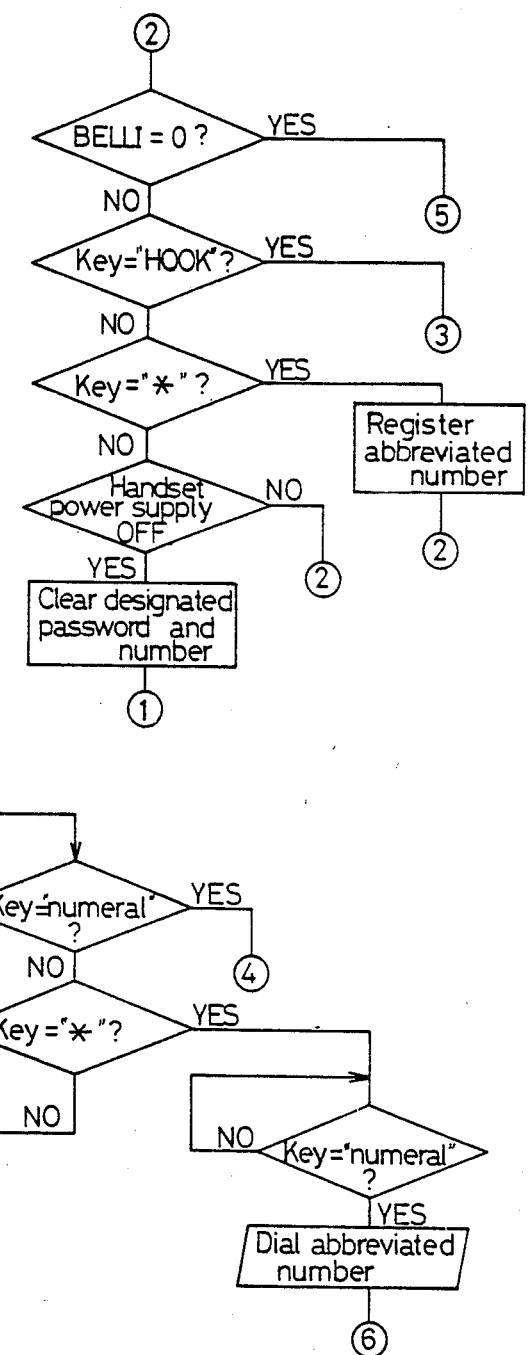

As shown in FIG. 6, when the handset 20 is brought into an operative state, the microcomputer CPU refers to a flag BELLI. This flag BELLI is a signal which is output from the master telephone 30. Normally, it is "1", whereas, when the master telephone 30 is called (i.e., when there is a telephone call), the flag BELLI is down, that is, "0" is set. When the flag BELLI is "0", the incoming processing (see FIG. 9) is executed. When the flag BELLI is not "0", the microcomputer CPU then checks whether or not the key 'HOOK' has been actuated. If YES, it is judged that dialing has been started, and the calling processing (see FIGS. 7 and 8) is executed.

Further, the microcomputer CPU checks whether or not the key '*' has been actuated. If YES, it is judged that the user desires to make registration of an abbreviated number, and the microcomputer CPU executes the abbreviated number registration processing [see the above-described vi)]. After the execution of the abbreviated number registration processing, the microcomputer CPU refers to the flag BELLI again and repeats the subsequent steps. When the power switch SW1 on the handset 20 is turned OFF, the stored designated password is cleared, and the process returns to the beginning of the flowchart shown in FIG. 5 to watch whether or not the power switch SW1 is turned ON again. If the power switch SW1 is turned ON, the microcomputer CPU refers to the flag BELLI again and repeats the subsequent steps.

Figure 7:
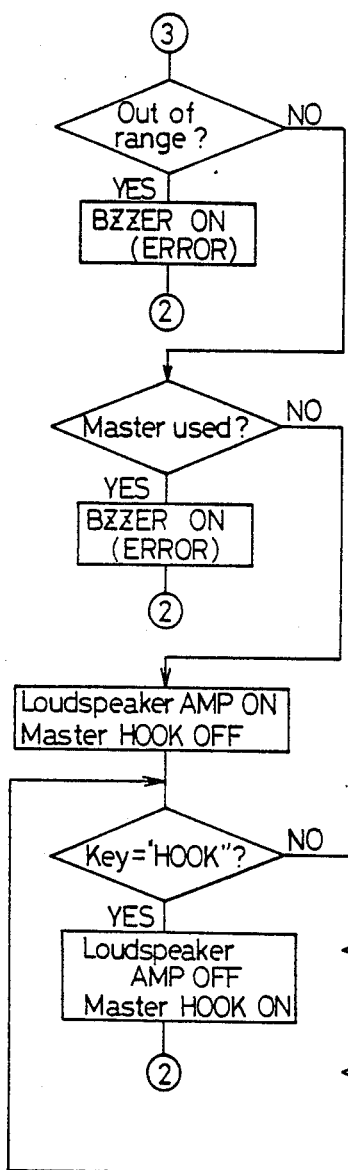

The calling processing will next be explained with reference to FIGS. 7 and 8.

First, it is judged whether or not the mobile telephone 30 is within a range where radiotelephone communication can be made. If the mobile telephone 30 is out of said range, a buzzer sound is generated from the loudspeaker incorporated in the handset 20 to inform the user that it is impossible to make radiotelephone communication. If the mobile telephone 30 is within said range, it is judged whether or not the mobile telephone (master telephone) 30 is being used on the basis of the hook state thereof. If YES, a buzzer sound is generated from the loudspeaker of the handset 20 to inform the user that it is impossible to make a telephone call. If the mobile telephone (master telephone) 30 is not used, the loudspeaker amplifier 39 is activated (turned ON), and the hook of the master telephone 30 is set in an OFF state. Then, the microcomputer CPU checks whether or not the key 'HOOK' on the handset 20 has been actuated. If YES, that is, if the calling has been canceled, the loudspeaker amplifier 39 is turned OFF, and the hook of the master telephone 30 is changed to an ON state. If there is no cancellation of the calling, the microcomputer CPU checks whether or not any of the keys, including the numeral keys and the key '*', has been actuated. If NO, the microcomputer CPU stands by for any of the keys to be actuated.

When a numeral key alone is actuated, the microcomputer CPU judges that the user is going to make an ordinary call, and executes the ordinary calling processing (see FIG. 8). When the key '*' is actuated, the microcomputer CPU judges that the user is going to make an abbreviate number call, and waits for any of the numeral keys to be further actuated [see the above-described vii)]. When any of the numeral keys is actuated, the corresponding telephone number is read out from the telephone number memory section on the basis of the designated password and abbreviated number which have been stored in relation to this call and the read-out telephone number is transmitted. Thereafter, the handset talking processing shown in FIG. 10 is executed.

It should be noted that the abbreviated number is 0, it is judged that the user desires to make a last number call, and therefore the telephone number which has been stored in a last number memory is transmitted.

In the case of ordinary calling, as shown in FIG. 8, the last number memory (storing a telephone number used in the previous ordinary calling) is first cleared, and a signal which represents an actuated numeral key is then dialed (transmitted). Next, the transmitted numeral-key signal is stored in the last number memory. Thereafter, signals representing actuated numeral keys are successively dialed and stored in the last number memory unless the master telephone is unhooked or the key 'HOOK' is actuated. If the called party answers the call, the handset 20 is brought into an engaged state.

If the master telephone 30 is unhooked when the handset 20 is being used, it is also possible to talk over the master telephone 30 When it is confirmed that the master telephone 30 has been unhooked on the basis of a hook signal resulting from the unhooking of the master telephone 30, the loudspeaker amplifier 39 is turned OFF so that the voice from the loudspeaker 23a does not interfere with the master telephone 30. Further, the master telephone talking processing (see FIG. 11) is executed. If the master telephone 30 is not unhooked, the microcomputer CPU continuously checks whether or not the key 'HOOK' of the handset 20 has been actuated (the end of the call) or the master telephone 30 has been unhooked. If the key 'HOOK' is actuated, the loudspeaker amplifier 39 is turned OFF, and the hook of the master telephone 30 is set in an ON state.

In this way, the calling processing is carried out. The incoming processing will next be explained.

As shown in FIG. 9, the microcomputer CPU refers to the flag BELLI to judge whether or not the handset 20 is in an incoming state. If the flag BELLI is "0" and the handset 20 is therefore judged to be in an incoming state, the microcomputer CPU judges whether or not the master telephone 30 is unhooked on the basis of a hook signal from the master telephone 30. If the master telephone 30 has been unhooked, the master telephone talking processing shown in FIG. 11 is becomes possible to talk over the handset 20. Further, the handset talking processing (see FIG. 10) is executed.

In the handset talking processing shown in FIG. 10, it is first judged whether or not the master telephone 30 is unhooked. If YES, the loudspeaker amplifier 39 is turned OFF so that the voice from the loudspeaker 23a does not interfere with the master telephone 30. Thereafter, the master telephone talking processing shown in FIG. 11 is carried out. If the master telephone 30 is not unhooked, it is judged whether or not the master telephone 30 is within a range where radiotelephone communication can be made. If the master telephone 30 is out of said range, the loudspeaker amplifier 39 is turned OFF, and the hook of the master telephone 30 is brought into an ON state. Further, a buzzer sound is generated from the loudspeaker incorporated in the handset 20 and the call is ended. If the master telephone 30 is within said range, the handset 20 is continuously maintained in the operative state until the key 'HOOK' is actuated. When the key 'HOOK' is actuated, the loudspeaker amplifier 39 is turned OFF, and the hook of the master telephone 30 is brought into an ON state, thus completing the call.

On the other hand, in the master telephone talking processing shown in FIG. 11, it is first judged whether or not the master telephone 30 is hooked. When the master telephone 30 is hooked, the call is ended in response to the hook signal delivered from the master telephone 30. When the master telephone 30 is being unhooked, the talking state of the master telephone 30 is continued until the key 'HOOK' is actuated as long as the master telephone 30 is within the range where radiotelephone communication can be made. When the key 'HOOK' is actuated, the microcomputer CPU sets the hook of the master telephone 30 in an OFF state. When the hook of the master telephone 30 is subsequently brought into an ON state, the microcomputer CPU judges that the master telephone 30 has been hooked, and turns ON the loudspeaker amplifier 39, thus enabling talk over the handset 20. Thereafter, the handset talking processing (see FIG. 10) is executed.

It should be noted that the password which has been registered is erased by suspending the supply of electric power to the microcomputer CPU.

As has been described in detail, according to the present invention, the telephone number memory section for storing terminating subscriber's telephone numbers is accessed on the basis of a combination of an abbreviated number and a password. Accordingly, if the password input is inappropriate, the desired terminating subscriber's telephone number is not read out, and therefore there is no fear of the stored telephone numbers coming to a third person's knowledge.

In addition, although it is necessary to increase the storage capacity of the telephone number memory section, the combination of an abbreviated number and a password enables the same abbreviated number to be used for a number of telephone numbers which is equal to the number of different kinds of password. Accordingly, it is possible to improve considerably the abbreviated number call function of the telephone apparatus.

Although the present invention has been described through specific terms, it should be noted here the described embodiment is not necessarily exclusive and various changes and modifications may be imparted thereto without departing from the scope of the invention which is limited solely by the appended claims.

What is claimed is:

1. A telephone apparatus comprising:
   abbreviated number input means for inputting an abbreviated number in a predetermined form;
   password input means for inputting a password in a predetermined form;
   a telephone number memory section for storing terminating subscriber's telephone numbers in correspondence with combinations of abbreviated numbers and passwords; and
   a control section for selecting and outputting a terminating subscriber's telephone number from said telephone number memory section in response to a dialing start signal and on the basis of a combination of an abbreviated number and a password included in said dialing start signal.

2. A telephone apparatus according to claim 2, wherein said telephone number memory section has a password memory section, an abbreviated number memory section and a telephone number memory section.

3. A telephone apparatus for a vehicle comprising:
   a portable handset;
   password input means secured to said handset for inputting a password in a predetermined form;
   a steering column disposed in said vehicle;
   a steering wheel rotatably supported on said steering column;
   a telephone number memory section disposed inside said steering column to store terminating subscriber's telephone numbers in correspondence with combinations of abbreviated numbers and passwords; and
   a control section for selecting and outputting a terminating subscriber's telephone number from said telephone number memory section in response to a dialing start signal and on the basis of a combination of an abbreviated number and a password included in said dialing start signal.

4. A telephone apparatus according to claim 3, wherein said handset further has:
   first and second microphones constituting in combination a gradient microphone;
   a first loudspeaker for remote talking; and
   a second loudspeaker for close talking.

5. A telephone apparatus according to claim 4, wherein said first microphone and said first loudspeaker are disposed on one side of said handset, while said second microphone and said second loudspeaker are disposed on the other side of said handset 6. A telephone apparatus according to claim 5, wherein said password input means is disposed on said first side of said handset.

* * * * *